United States Patent [19]
Kleinatland et al.

[11] 4,134,636
[45] Jan. 16, 1979

[54] ELECTRICAL OUTLET AND UNDER PLATE ASSEMBLY

[76] Inventors: Joseph W. Kleinatland, 281 Willowview Dr., Akron, Ohio 44319; Dale J. Lucore, 3382 S. Arlington Rd., Akron, Ohio 44312

[21] Appl. No.: 788,613

[22] Filed: Apr. 18, 1977

[51] Int. Cl.² .............................................. H02G 3/12
[52] U.S. Cl. ................................. 339/122 R; 174/58; 220/3.9
[58] Field of Search .............. 339/122, 123, 132, 133; 220/3.2–3.9; 174/50, 52 R, 53–58

[56] References Cited

U.S. PATENT DOCUMENTS

| 3,268,189 | 8/1966 | Ducharme | 220/3.3 X |
| 3,684,819 | 8/1972 | Wilson | 174/53 |
| 3,770,873 | 11/1973 | Brown | 220/3.2 X |

FOREIGN PATENT DOCUMENTS 1221328  7/1966  United Kingdom ..................... 174/53

Primary Examiner—Roy Lake
Assistant Examiner—E. F. Desmond
Attorney, Agent, or Firm—Oldham, Oldham, Hudak & Weber Co.

[57] ABSTRACT

The combination of an electrical outlet box with an under plate wherein the outlet box has end walls and side walls and the under plate is a molded plastic insulator panel having a center tubular portion sized for telescopic engagement with the outlet box, the center portion being a continuous wall defining an open center area in the plate, and the plate having a continuous peripheral portion for engaging a building surface when the outlet box is positioned in a hole in such surface, and the center portion insulating terminal portions of an associated outlet receptacle.

2 Claims, 7 Drawing Figures

U.S. Patent  Jan. 16, 1979  Sheet 1 of 2  4,134,636
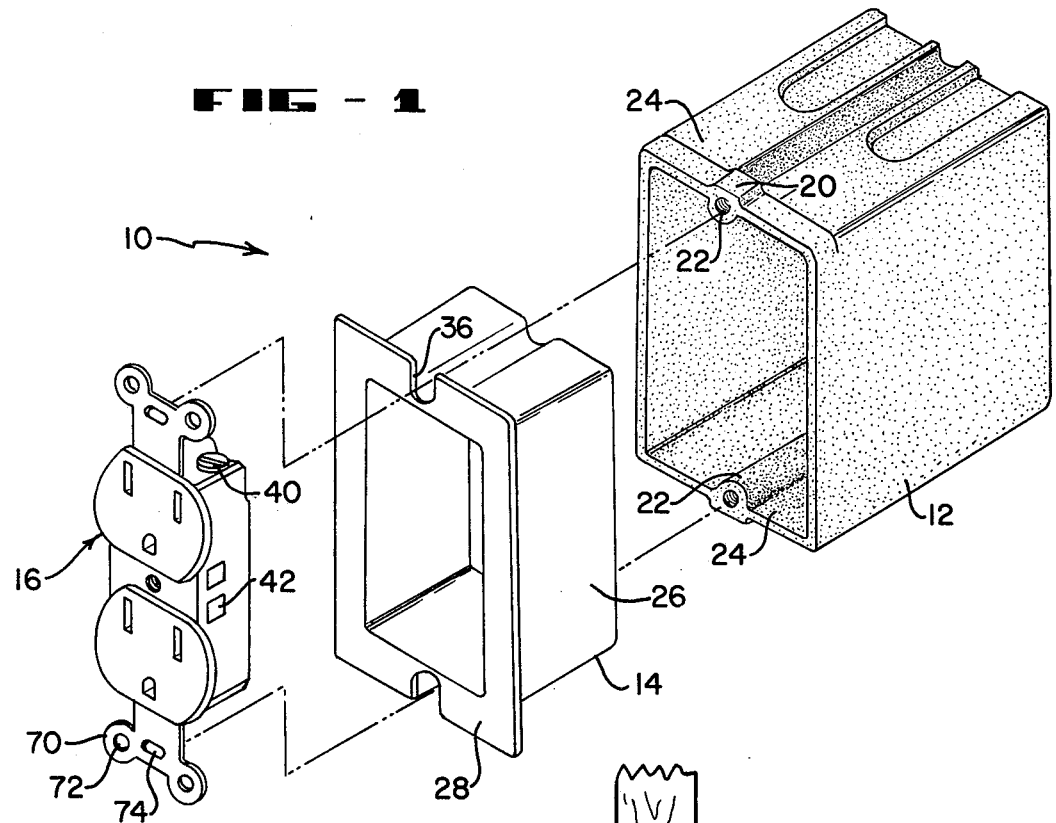
FIG-1
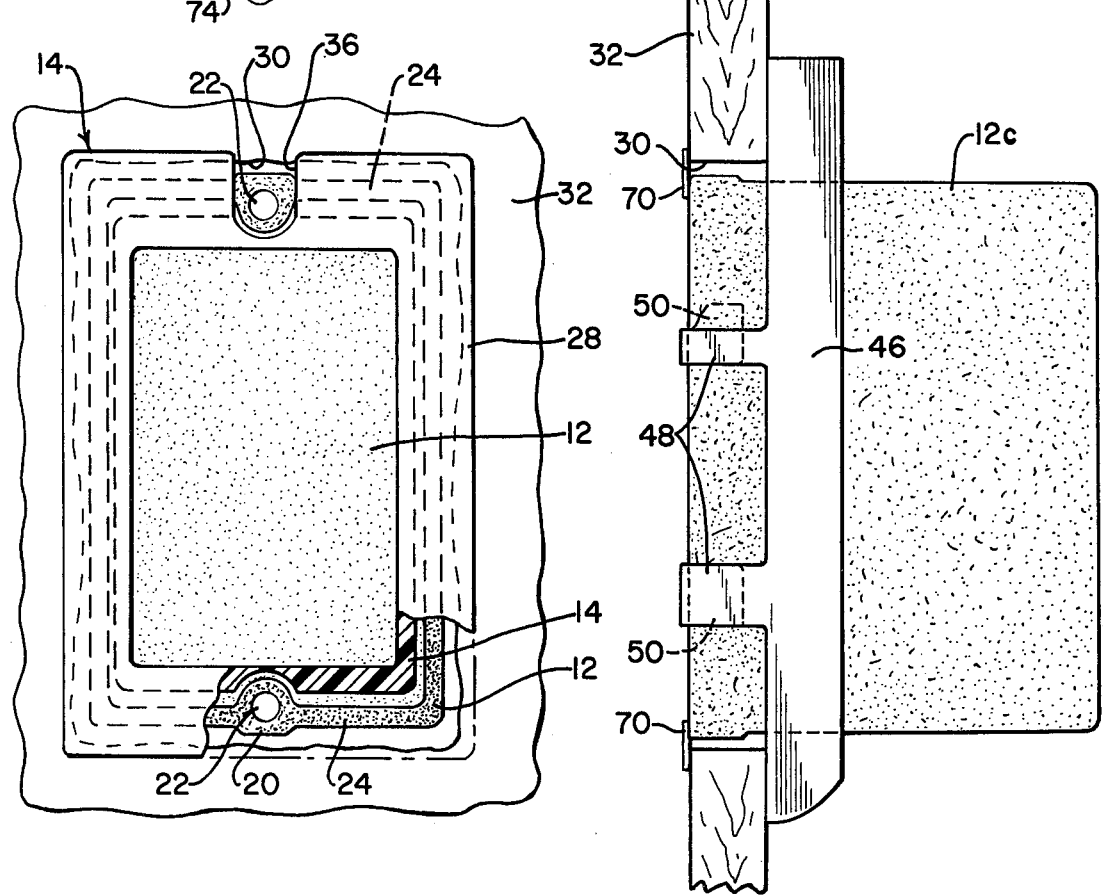
FIG-2
FIG-3

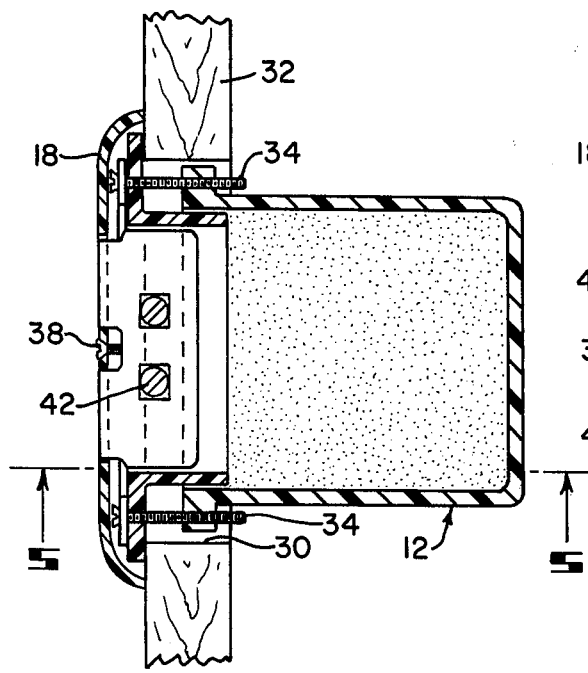
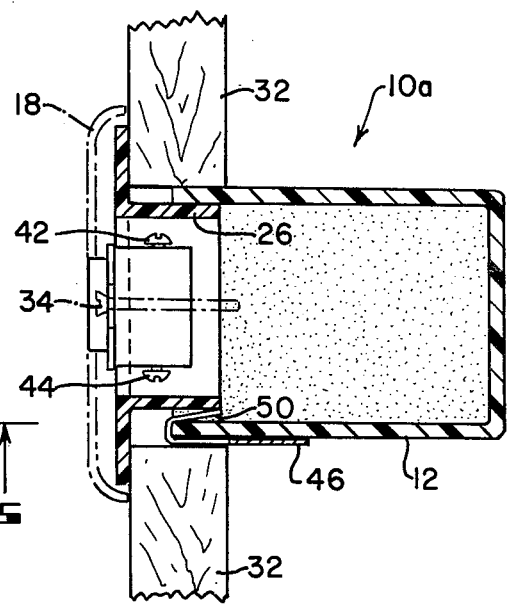
FIG-4     FIG-5
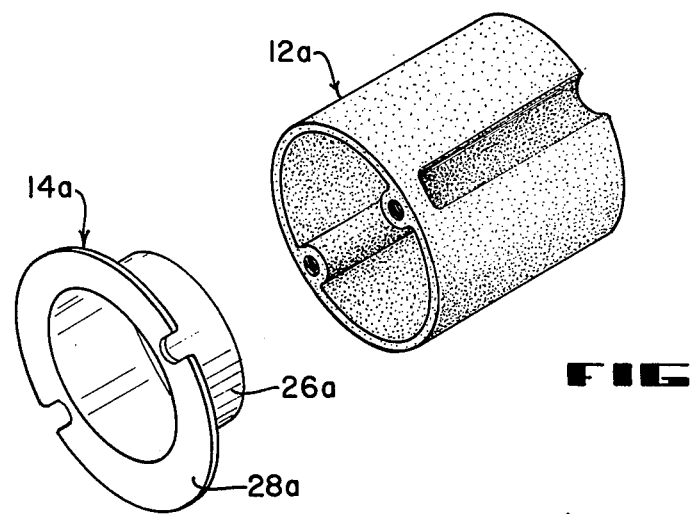
FIG-6
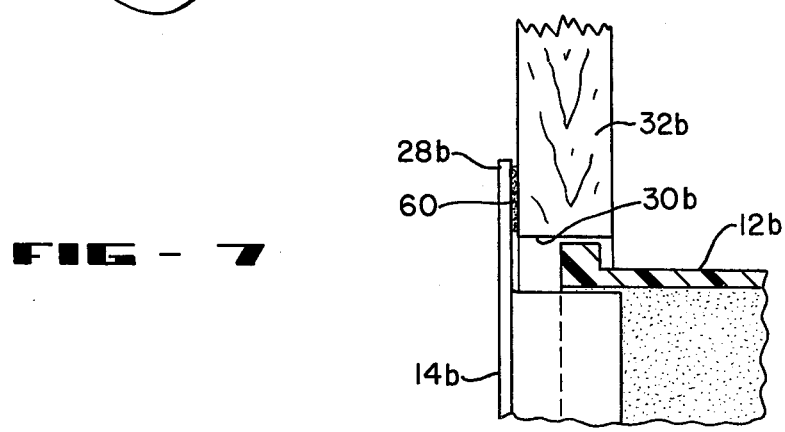
FIG-7

ELECTRICAL OUTLET AND UNDER PLATE ASSEMBLY

BACKGROUND OF THE INVENTION

In the building industry, the positioning of electrical outlet boxes and the connections thereto are covered by a number of building code requirements. In general, these code requirements are set up to insure a good workmanlike assembly of the outlet box in the builindg, and to insure safety in the use of electrical receptacle plugs in the outlet box and the permanent satisfactory positioning of power supply leads connecting to the box and outlet receptacles positioned therein.

Thus, in the assembly of the outlet boxes in walls, if these walls are made of non-combustible material, the boxes should be so installed that the front edge of the box will not set back of the finished surface more than ¼ inch, whereas in walls and ceilings constructed of wood or other combustible materials, the outlet boxes shall be flush with the finished surface of or project from such wall premises (Article 370-10 Uniform Electrical Building Code). Yet other portions of the building code require that plaster surfaces that are broken or incomplete adjacent the box shall be repaired so that there are no gaps or open spaces at the edge of the outlet box.

Other portions of the building code require that where a fixture canopy or pan is used, any combustible wall or ceiling finish material exposed between the edge of the canopy or pan and the outlet box shall be covered with a non-combustible material (Article 370-15B), while Artilce 370-23 relates to non-metallic boxes. It requires that the supports or other mounting means for non-metallic boxes shall be outside of the box or the box shall be so constructed as to prevent contact between the conductors in the box and any metallic means in the box.

In many outlet boxes today, especially where they are provided in older buildings to replace prior installations, so-called Madison Holdites or other similar strap metal plates are used to secure the box to the wall, and these strap metal plates extend from outside the box to inside the box and provide auxiliary mounting means for the outlet box. But, the portions of the metallic members extending into the box from the outer surface thereof do provide a safety hazard, as well as a special problem in meeting the code requirements.

Reference is made to prior U.S. Pat. No. 3,115,265 on an expandable protector for an electrical outlet box, but such expandable protector involves a sleeve means made from a number of different metallic members that are costly and cumbersome to produce, assemble, and use. Furthermore, such expandable protector member does not provide any continuous flange means on a sleeve member connecting an outlet box to a supporting wall and to receptacle outlets positioned in the box. Hence, in prior installations, it was not assured that some part of the relatively short semi-randomly positioned flanges on the expandable protector would definitely bridge over holes in the wall and contact a wall surface. Nor did the prior unit positively aid in securing or supporting the duplex receptacle in the outlet box. The prior unit did not insure a positive permanent support of the duplex receptacle in the outlet assembly. Furthermore, the current tendency is that the requirements of the electrical building codes are becoming more stringent and the requirements for both grounding the outlet box itself and for providing a grounded conductor therein are being made stronger.

The general object of the present invention is to provide a novel and improved under plate for use in assembling duplex outlet receptacles in outlet boxes.

Another object of the invention is to provide a safer operative assembly of an outlet box, under plate and outlet receptacle.

Another object of the invention is to provide a relatively inexpensive, molded, one-piece plastic part to form an under plate in electrical outlet boxes, and to form this under plate, which only needs be formed in a minimum of different sizes for telescoping engagement with outlet boxes, and to provide a good connector medium and a safe insulation member connecting the outlet boxes to its cover plate and the duplex receptacle mounted in the outlet box.

The foregoing and other objects and advantages of the invention will be made more apparent as the specification proceeds.

Reference now is particularly made to the accompanying drawings wherein:

FIG. 1 is an exploded view of an outlet box assembly embodying means of the invention;

FIG. 2 is a front elevation of the outlet box as mounted in a building;

FIG. 3 is a section of a wall with a side elevation of an outlet box having a modified positioning means associated therewith securing it in the wall;

FIG. 4 is a fragmentary longitudinal vertical section through the outlet box and associated means;

FIG. 5 is an enlarged size cross section taken on line 5—5 of FIG. 4;

FIG. 6 is an exploded view of a modified type of outlet receptacle and an under plate of the invention therefor; and FIG. 7 is a fragmentary vertical section through a modified under plate and positioning means of the invention.

When referring to corresponding members shown in the drawings and referred to in the specification, corresponding numerals are used to facilitate comparison therebetween.

INVENTIVE SUBJECT MATTER

The combination of an electrical outlet box with an under plate wherein the outlet box has end walls and side walls, the under plate is a molded plastic insulator panel having a center tubular flange portion sized for telescopic engagement with said outlet box, said center portion being a continuous wall defining an open center area in said plate, said plate having a continuous peripheral portion for engaging a building surface when said outlet box is positioned in a hole in such surface, and the center flange portion being sized to extend into the outlet box and insulate terminals of an outlet receptacle positioned in the outlet box.

Particular attention now is directed to the details of the structures shown in the accompanying drawings, and an outlet box and under plate assembly is indicated as a whole by the numeral 10. This assembly 10 particularly comprises any style of a conventional outlet box 12 and under plate 14, and usually the assembly includes a conventional switch or outlet receptacle 16, and a cover plate 18.

The outlet box 12 usually is made from a plastic material and is suitably secured to any supporting structure, such as a stud or other member in a coventional manner (not shown). The outlet box usually includes a vertically extending edge flange 20 and it has some type of a securing aperture 22 formed in this flange on each end wall 24 of the outlet box.

The under plate 14 includes a center flange portion 26 that is sized for convenient telescopic engagement with the interior of the outlet box, and this center portion is continuous to form a tubular flange that extends around adjacent the interior walls of the outlet box when the assembly of the invention is made up. This under plate 14 is made from a suitable known moldable plastic material that is of an electrical insulation composition. The under plate 14 also includes a continuous peripheral flange or wall 28 which extends laterally and endwise of the outlet box 12 a sufficient distance as to bridge over any gap, as indicated at 30 in the drawings, in the building wall around the box. The plate 14 forms an insulated cover for the outlet box 12 in a wall 32 of a building in which the assembly 10 of the invention is positioned. Such wall, of course, can be made from plaster, dry board material, or other materials, as desired, and usually this opening 30 formed around the periphery of the outlet box 12 is of somewhat irregular shape and size.

FIG. 1 of the drawings indicates that the center portion 26 telescopes into the outlet box 12. The outlet receptacle 16 is operatively secured to the outer surface of this under plate 14 and at the same time is operatively attached to the outlet box 12 by cap screws 34 or the like. These screws 34 engage with end portions of the conventional outlet receptacle, extend through holes or openings 36 in ends of the underplate 14 in the edge flange 28 thereof, and engage with the conventional tapped holes or apertures 22 in the end walls of the outlet box. By the edge flange 28 of the under plate abutting on the wall 32 around the outlet box, a firm positioning for the outletreceptacle is provided in all instances. A screw 38 secures the cover plate to the outlet receptacle 16 in the usual manner.

Naturally, the conventional outlet receptacle 16 has a plurality of terminals provided thereon, and a ground terminal 40 normally is provided on one end of this receptacle, and pairs of terminals 42 and 44 are provided on opposite sides of the recepacle for connecting circuit wiring thereto in a conventional manner. Obviously, any and all leads connecting to these terminals 40, 42 and 44, must be properly insulated from any improper electrical contacts with metal members or grounding means.

In some outlet boxes as assembled in and positioned in homes today, it is desirable to use additional strap metal securing strips to aid in positioning these outlet boxes operatively in engagement with the wall. Thus, FIGS. 3 and 5 best show that a metal strap securing strip 46 is positioned externally of the outlet box 12 and protrudes longitudinally therebeyond for engaging with portions of the wall 32 adjacent the opening therein in which the outlet box assembly is positioned. Such strip 46 has a pair of protruding fingers 48, 48 thereon that extend therefrom and extend up over the opening provided in the outlet box and terminate in end portions 50 that protrude down into the outlet box at the upper side edges thereof. It will be noted that the continuous center portion or flange 26 of the under plate 14 extends down into the assembly of the invention further than the outlet receptacle 16. Thus, such center portion 26 prevents any possible contact between these ends 50 of the sections 48, and no possible shorting or grounding action involving the terminals of the outlet receptacle can occur even though a metal positioning means is operatively associated with a modified assembly 10a, FIG. 5, of the invention.

As previously indicated, the outlet boxes 12 of the invention are of any conventional form and a modified box 12a is shown in FIG. 6, wherein the box is of a generally tubular shape. It is adapted to receive a modified tubular under plate 14a that has a continuous edge flange 28a thereon, and has a tubular continuous wall center portion 26a. Hence, again, operative engagement is provided between the under plate and the outlet box for positioning outlet receptacles or switches therein, and for permitting a cover plate to be engaged with the apparatus in a conventional manner.

FIG. 7 shows yet a further modification of the apparatus of the invention wherein an under plate 14b is shown positioned in engagement with an outlet box 12b. The assembly is associated with a building wall 32b having an opening 30b therein. This particular construction has the under plate 14b operatively secured to the wall 32b by means such as a double faced adhesive tape 60 that is secured to an edge flange 28b of this under plate. Hence, the under plate is operatively engaged with the building wall and will be retained in position for mounting an outlet receptacle in the usual manner. At the same time, the under plate bridges over between the outlet box and the building wall to aid in meeting all building code requirements.

When making installations in existing buildings, usually the outer edges of the receptacles 12c as shown in FIG. 3 would be flush with the building wall surface. The receptacles are supported on the walls by use of the securing strips 46. Also, usually the end flanges or brackets 70 on the outlets or sockets 16 bridge over the wall opening to engage the wall to enable screws received in holes 72 in the flange to be secured to the wall. The under plate flange is cut out if necessary to pass the screws in the holes 70. Screws 34 in holes 74 in the flange extend through holes or slots in the under plate 14 to engage the receptacle 12. The construction shown in FIGS. 4 and 5 can readily be modified to bring the receptacles 12 out with their open edges substantially flush with the wall edge.

The apparatus and assembly of the invention are relatively uncomplicated. But, at the same time, the use of the under plate of the invention provides a very safe electrical connector means to aid in positioning an outlet box in a building. Safety of installation and use of the electrical outlet, hence, is facilitated and the objects of the invention are achieved.

While several complete embodiments of the invention have been disclosed herein, it will be appreciated that modification of these particular embodiments of the invention may be resorted to without departing from the scope of the invention.

What is claimed is:

1. The combination of an electrical outlet with an extension plate wherein the outlet box has end walls and side walls, and the extension plate is a rigid molded plastic insulator member having a center flange portion sized for telescopic engagement with said outlet box to extend the effective length thereof, said center flange portion being a continuous wall defining an open center area in said plate, and said plate having a continuous peripheral portion for engaging a building surface when said outlet box is positioned in a hole in such surface, and said plate bridges over areas immediately adjacent the entire periphery of said outlet box; and outlet receptacle positioned in said outlet box, said center portion extending into said outlet box to cover and insulate terminal portions on said outlet receptacle from said outlet box; and a strap metal securing strip engaging a side wall of said outlet box and having an elongate section outside the box and protruding longitudinally therebeyond and several positioning fingers extending into and engaging said outlet box wall on the inner surface thereof, and being insulated from any electrical contact means within said center flange portion.

2. The combination of an electrical outlet with an extension plate wherein the outlet box has end walls and side walls, and the extension plate is a rigid molded plastic insulator member having a center flange portion sized for telescopic engagement with said outlet box to extend the effective length thereof, said center flange portion being a continuous wall defining an open center area in said plate, and said plate having a continuous peripheral portion for engaging a building surface when said outlet box is positioned in a hole in such surface, and said plate can bridge over areas immediately adjacent the entire periphery of said outlet box; an outlet receptacle positioned in said outlet box, said center portion extending into said outlet box to cover and insulate terminal portions on said outlet receptacle from said outlet box; and a strap metal securing strip engaging a side wall of said outlet box and having an elongate section outside the box and extending axially beyond the end of the box, said securing strip also having several positioning fingers extending into and engaging said box side wall on the inner surface thereof, said fingers being between said extension plate center section and said box wall, said securing strip being adapted to engage a wall surface spaced axially from the end of said outlet box.

* * * * *

UNITED STATES PATENT OFFICE
CERTIFICATE OF CORRECTION

PATENT NO. : 4,134,636
DATED : January 16, 1979
INVENTOR(S) : Joseph W. Kleinatland and Dale J. Lucore It is certified that error appears in the above-identified patent and that said Letters Patent are hereby corrected as shown below:

Column 1, line 10, change "builindg" to --building--.

Column 1, line 33, change "Artilce" to --Article--.

Column 3, line 35, a space should be between "outlet" and "receptacle".

Column 4, line 68, "and" should read -- an --.

Signed and Sealed this

Eighth Day of May 1979

[SEAL]

Attest:

RUTH C. MASON
Attesting Officer

DONALD W. BANNER
Commissioner of Patents and Trademarks